Jan. 6, 1953   E. W. TODD   2,624,256
FLEXIBLE TRACTOR IMPLEMENT HITCH
Filed March 28, 1947   4 Sheets-Sheet 1
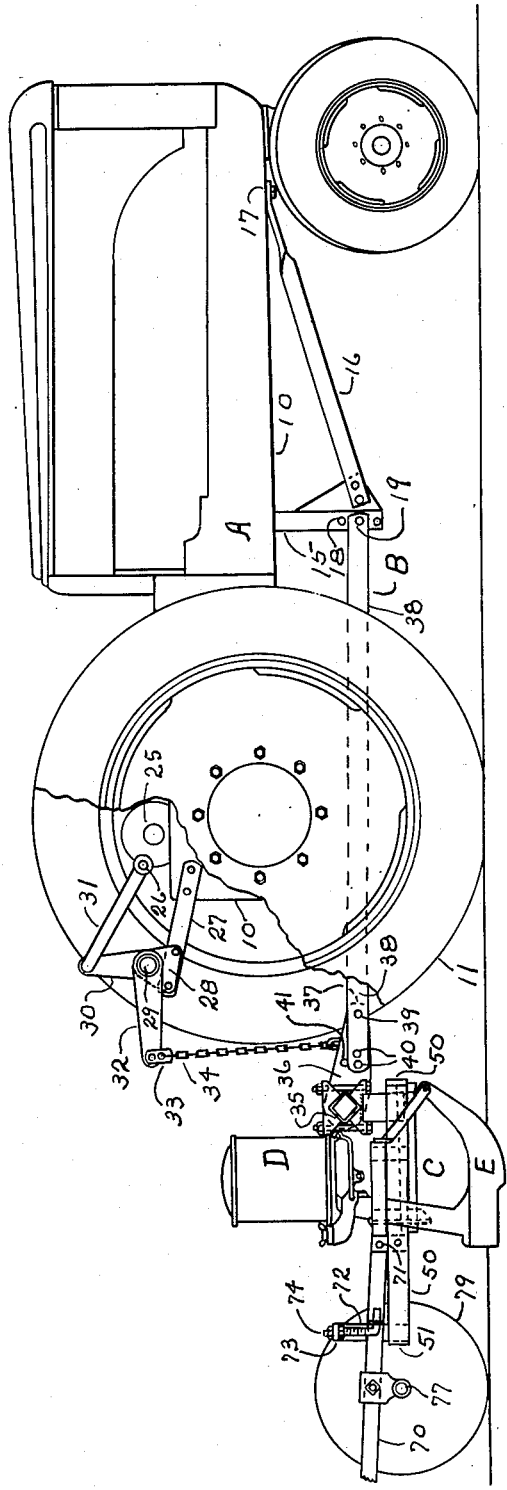
INVENTOR.
EVERETT W. TODD
BY A. Strob
ATTORNEY

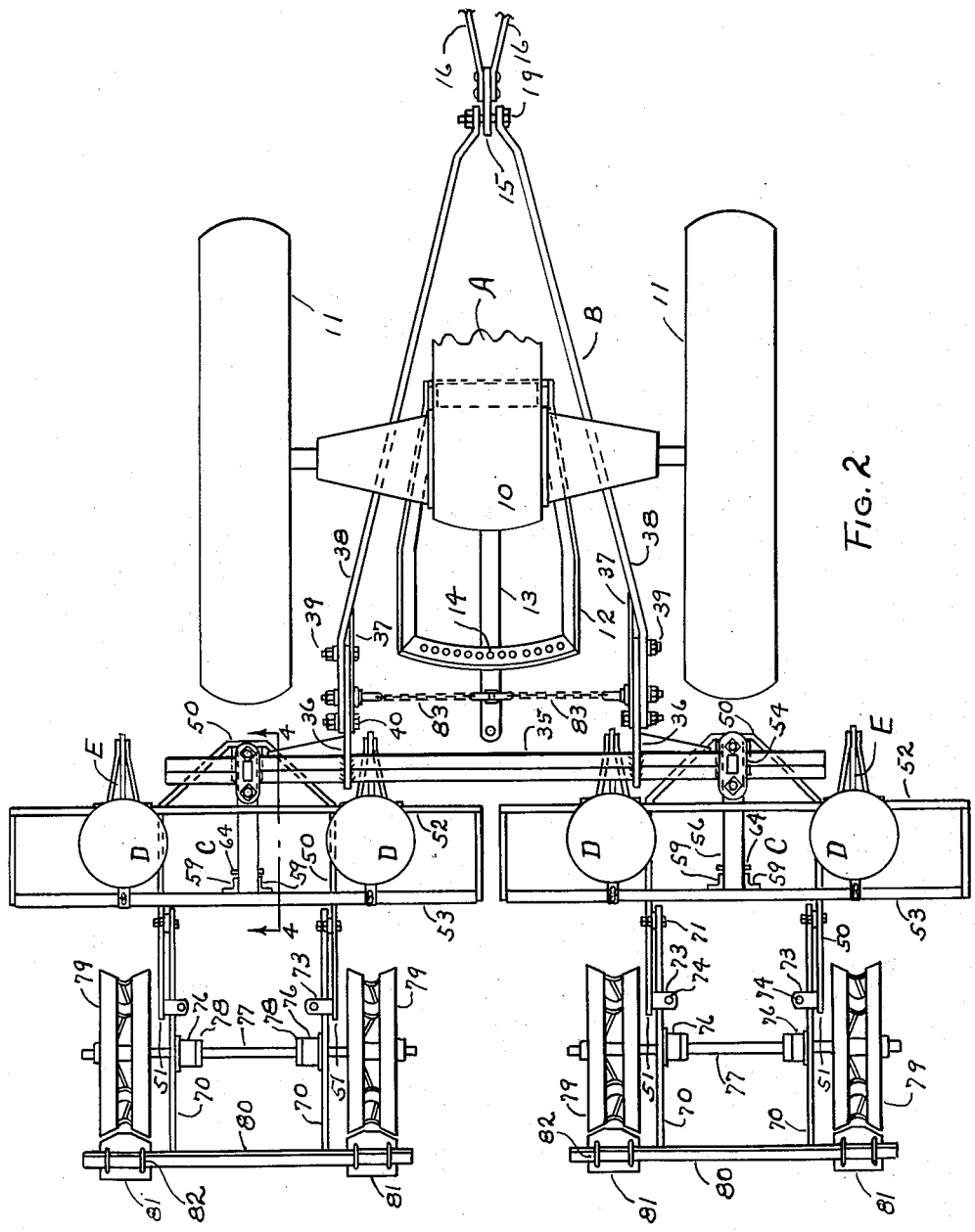

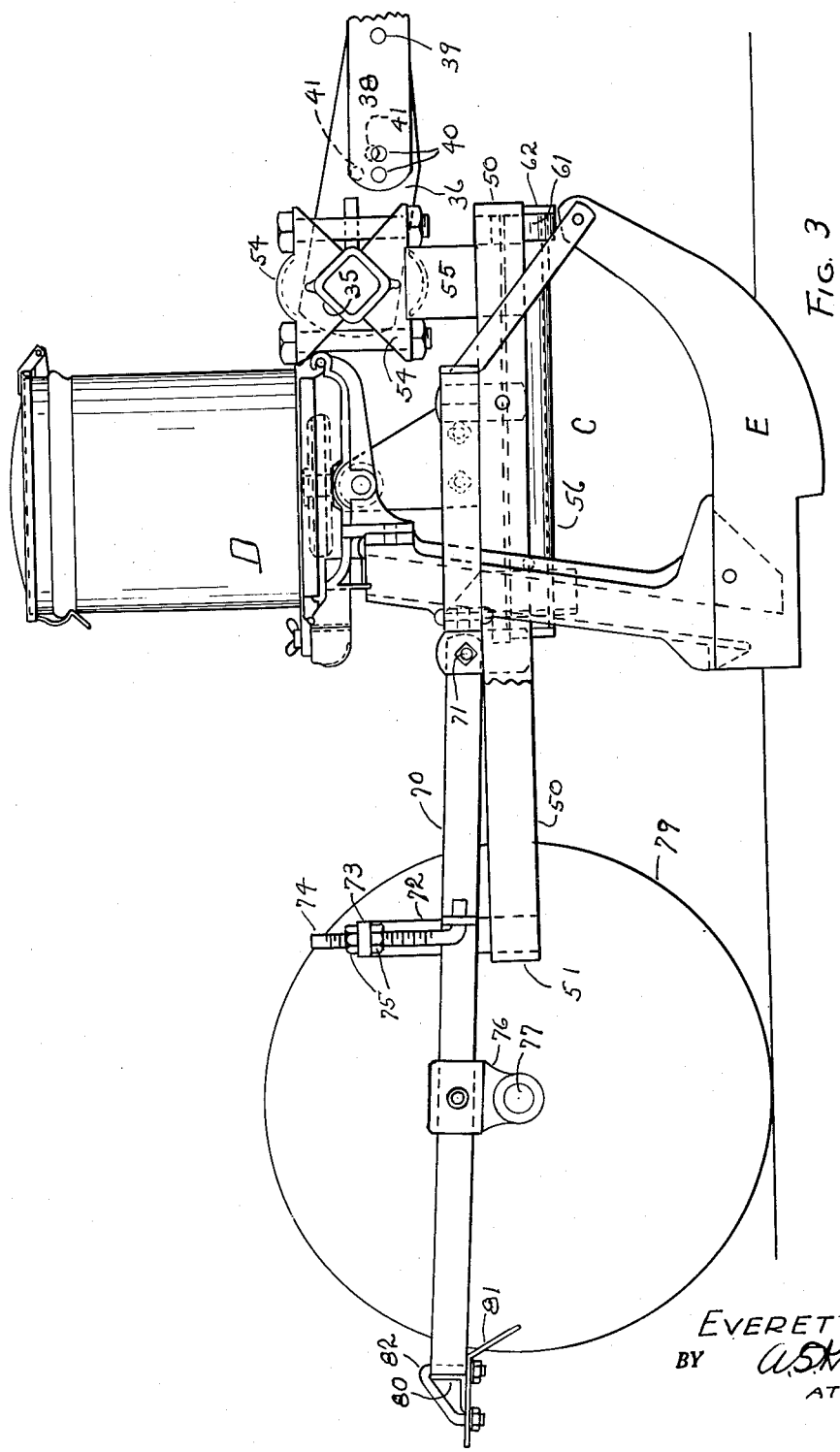

Jan. 6, 1953     E. W. TODD     2,624,256
FLEXIBLE TRACTOR IMPLEMENT HITCH
Filed March 28, 1947     4 Sheets-Sheet 4
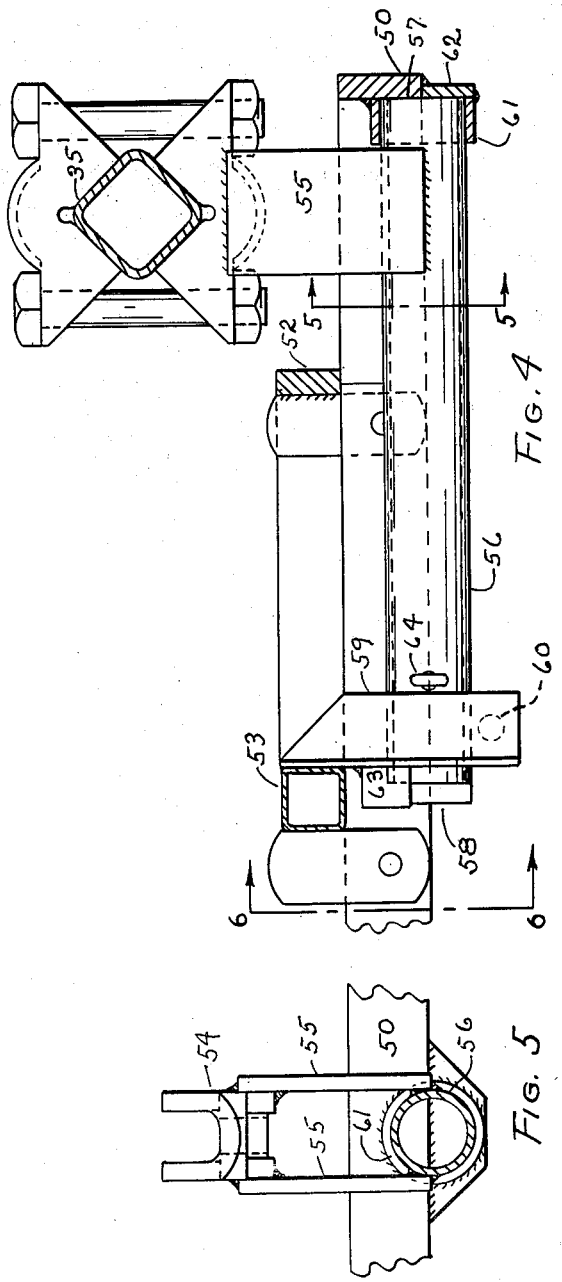
INVENTOR.
EVERETT W. TODD
BY
ATTORNEY Patented Jan. 6, 1953

2,624,256

UNITED STATES PATENT OFFICE 2,624,256

FLEXIBLE TRACTOR IMPLEMENT HITCH

Everett W. Todd, Racine, Wis., assignor to The Massey-Harris Company, Racine, Wis., a company of Maryland Application March 28, 1947, Serial No. 737,811

1 Claim. (Cl. 97—47)

It is an object of this invention to provide an implement comprising wheeled laterally spaced units flexibly connected to a tractor for independent transverse rocking or tilting of the units.

It is a further object to provide a flexible hitch connection between the units and a vertically liftable transverse tool bar on a tractor such that in the lowered position of the tool bar the units are free to rock transversely as they follow the contour of the ground and in lifted position of the tool bar the units are supported for transport and are held from rocking transversely.

To these and other useful ends my invention consists of parts, combinations of parts or their equivalents and mode of operation as hereinafter described and claimed and shown in the accompanying drawings in which:

Fig. 1 is a side elevational view of my device as attached to a conventional tractor.

Fig. 2 is a top view of the device as shown in Figure 1 less the power lift, a fraction only of the tractor being shown.

Fig. 3 is an enlarged side elevational view of one of the planter units, showing a fraction of the main frame.

Fig. 4 is a section of a planter unit taken on line 4—4 of Figure 2, and showing the longitudinal hinge connection to the tool bar.

Fig. 5 is a section of the planter hinge connection taken on line 5—5 of Figure 4.

Fig. 6 is a rear view from the hinge connection shown in Figure 4, and illustrating a fraction of a planter frame and taken on lines 6—6 of Figure 4.

Fig. 7 is a rear view somewhat similar to Figure 6 showing the device in an operating position and the left hand planter frame somewhat tilted.

As thus illustrated the tractor is designated by reference character A, the main frame of the planter attachment is designated in its entirety by reference character B. The planter units are designated in their entireties by reference characters C. Member A may be a conventional tractor having preferably a power lift as illustrated in Figure 1.

Planter units C preferably are very similar to the frame of the well known two row two horse corn planters, having seed cans D and runners E which may be of any well known design but preferably similar to a conventional corn planter furrow opener as shown.

Tractor A is provided with a main frame 10 having rear carrying wheels 11—11. Secured to main frame 10 is a draw bar guide frame 12 (see Figure 2), and a draw bar 13 which is vertically hinged at its front end to frame 10, the rear end being slidably supported by member 12 with means for locking its rear end in any desired transverse position. It is shown in Figure 2 as being locked in its medial position by means of a bolt or lynch pin as at 14. Frame 10 is provided with a downwardly extending hitch member 15 (see Figure 1) having secured to its lower end braces 16—16 which are at their forward ends secured to member 10 as at 17. Member 15 is preferably provided with a number of vertically spaced holes 18, to one of which the front end of member B is loosely connected by means of a bolt or lynch pin as at 19.

The power lift of tractor A comprises preferably a shaft 25 having a connection preferably to a half turned conventional power lifting mechanism mounted on member 10. Shaft 25 has secured to its end a crank pin 26 which turns one half revolution for each operation of the lifting mechanism. I provide supporting means 27 consisting preferably of two bars secured to opposite sides of frame 10 each having a bearing 28 in which a shaft or tube 29 is rotatably mounted.

An arm 30 is secured to member 29 having a connection at its free end to crank pin 26 by means of links 31—31. On each end of shaft 29 I secure an arm 32 having pivoted thereon a link 33 which depends downwardly and has an opening with a key at its bottom for the adjustable reception of chains 34, the lower ends of these chains being connected in any suitable manner to opposite sides of frame B.

Frame B comprises a tool bar 35 secured to plates 36—36 each plate being secured to member 35 preferably by electric welding. The forward ends of plates 36 terminate as at 37 and are pivotally bolted to forwardly converging main frame members 38—38 as at 39—39, the forward ends of members 38 being secured to member 15 as at 19 as already described.

A number of holes 40—40 are provided near the rear ends of members 38 and a number of holes 41 are provided in members 36 properly staggered so the angle of tool bar 35 may be adjusted relative to members 38 and locked in the selected position by means of a bolt which extends through registering holes 40 and 41.

In Figure 1 the planter attachment is shown in a working position. When the lifting device is engaged for turning shaft 25 one half revolution it will be seen that the rear end of member B will be lifted and held in its lifted position until the lifting device is again engaged so as to move the device to its operating position as shown in Figure 1, at which time chains 34 are left slack.

Units C comprise frame bars 50—50 which are U-shaped about as shown in Figure 2, the rear ends terminating as at 51—51. Front transverse bars 52—52 are secured to members 50 (see Figures 2 and 4) and rear transverse bars 53 are also secured to members 50. The ends of bars 52 and 53 extend a distance past members 50. I preferably slidably mount on these ends furrow openers E and seed cans D. I provide a hinge connection between tool bar 35 and planter frames C as follows:

Brackets 54 are suitably clamped to tool bar 35 as clearly shown in Figure 4, each having downwardly depending plates 55—55 (see Figure 5) which are preferably electric welded to a tube 56 the tube terminating at its front end at 57 its rear being secured to bar 58. Thus tube 56 is rigidly secured to tool bar 35 and can be moved transversely on the tool bar for a purpose which will hereinafter appear. The forward end of each tube is received and loosely journaled in a sleeve or the like 61 mounted on frame bar 50. On members 53 I secure spaced depending bars 59—59, see Figure 6, the inner sides of these bars loosely contacting tube 56 and their bottom ends being connected together by means of spacers 60.

Depending bars 59 have blocks 63—63 secured thereto (see Figure 6). Thus tube 56 at its rear end is free to move vertically slightly between members 59, the distance being determined by the positions of members 60 and 63, the planter frames being free to rock transversely when tubes 56 are in contact with members 60 and when the device is raised by the power lift, blocks 63 will contact members 58 and generally hold the planter frames from rocking transversely. Applicant's device is designed so that when the rear end of member B is first raised, the front end only of members C will be raised slightly, after which a further raising of member B will cause member 58 to contact members 63 so as to raise the rear end of the planter units as well as the front and member 58 will then act to hold these units from tilting and when tube 56 rests on spacer 60, clearly the planter units may tilt as shown in Figure 7, because the planter frame is free at 61 and free at its rear end to rise or fall to a limited extent, as determined by the position of members 60 and 63.

I provide cotter pins 64 to prevent the planter frames C from moving forward on tubes 56 and members 50 and 62 prevent a rearward movement of the frames. The front ends of tubes 56 (see Figure 4) are rigidly secured to plates 55 so tubes 56 are rigidly carried by the rear end of hitch member B through the tool bar.

I provide means cooperating with member B at 19 for regulating the depth of the furrow openers as follows:

Bars 70—70 of each unit C are pivotally secured to members 50 at their forward ends by means of bolts 71—71 and members 50 at their rear ends are provided with rigidly attached brackets 72—72 which extend over members 70 as at 73. L-shaped threaded bolts 74—74 extend through members 73, their lower ends being anchored to members 70. Bolts 74 are provided with nuts 75—75 positioned on opposite sides of members 73. Thus it will be seen that by loosening bolts 71 bars 50 may at their rear ends be raised and lowered on bolts 71 as an axis by adjusting nuts 75 (see Figure 3). Each member 70 is provided with a bearing 76 through which an axle 77 is rotatably mounted and held from end movement by collars 78—78.

I adjustably secure depth wheels 79—79 to axles 77 and since the furrow openers are transversely adjustable on the planter frame, wheels 79 are also adjustable on axles 77; thus, the spaces between furrow openers E are adjustable by moving these openers on their frames and by moving brackets 54 on the tool bar so the four furrows may be equally spaced.

On the rear ends of bars 70 of each planter unit I secure a transverse member 80 in any suitable manner, the ends extending a considerable distance past bars 70. I slidably mount wheel scrapers 81 on the ends of members 80 by means of U-shaped bolts 82—82. Thus, the carrying wheels 79 may be adjusted so as to follow the furrow openers E and regulate the depth of these members. Clearly the adjustments provided between members 36 and 38 may under some circumstances be used for determining the depth of the furrow openers.

It will be seen that because of the hinge connection between the planter frames and tool bar, each carrying wheel will regulate the depth of its individual furrow opener and that when the power lift begins to lift the device the planter frames will lift slightly before the carrying wheels are lifted and also that the planter units will be guided by the tractor through its connection at 19 when in an operating position, and that the planter frames C will be held generally from tilting when in an inoperating position.

When the planter if lifted or in its inoperative position it is clearly free to swing sidewise. It is desired to limit this sidewise movement principally when the planter is in an inoperative position. I provide two chains 83—83, their inner ends being secured to member 13 and their outer ends to members 38 or to members 36, the chain being adjusted loose enough to provide sufficient transverse swinging movement for normal operations.

The means for driving the feed mechanism of the planter, forms no part of this invention and is not shown; however, it is preferably done by means of sprockets and chains between axles 77 and the feed mechanism of the planters.

It will be understood that the drawing and description outline the preferred designs. Clearly, however, many minor detail changes may be made in the design shown without departing from the spirit and scope of the appended claim.

Having thus shown and described my invention, I claim:

In combination with a tractor having a rearwardly-disposed vertically-liftable transverse tool bar, an implement including a frame mounted on transversely spaced wheels, means for flexibly connecting said frame to said tool bar comprising a tube disposed with its long axis extending generally parallel the path of travel of the tractor, said tube being rigidly secured to said tool bar below the same, said frame having a part at its front portion receiving and loosely journaling the forward end of said tube, vertically-disposed guide means mounted on said frame freely engaging the sides of the rear end of said tube, a stop associated with said guide means below the tube to limit downward vertical movement of said tube, transversely-spaced abutments fixed to said guide elements and disposed on the same level over the rear end of said tube, the long axis of said tube being disposed centrally of said frame and wheels, and a transverse horizontal member rigidly secured to the rear end of said tube, the vertical spacing of said stop and abutments being greater than the diameter of said tube, whereby in the lowered position of the tool bar said member is spaced from said abutments and the frame is free to rock transversely as the wheels follow the contour of the ground and in lifted position of the tool bar said member engages said abutments to hold said frame from rocking transversely.

EVERETT W. TODD.

REFERENCES CITED

The following references are of record in the file of this patent:

UNITED STATES PATENTS

| Number | Name | Date |
|---|---|---|
| 731,658 | Barry | June 23, 1903 |
| 1,460,236 | Ford | June 26, 1923 |
| 1,626,012 | Reuse | Apr. 26, 1927 |
| 1,760,128 | Enz | May 27, 1930 |
| 1,775,639 | Graham et al. | Sept. 16, 1930 |
| 1,855,252 | Miller | Apr. 26, 1932 |
| 1,952,503 | Kriegbaum et al. | Mar. 27, 1934 |
| 1,960,268 | Kriegbaum et al. | May 29, 1934 |
| 2,015,584 | Benjamin | Sept. 24, 1935 |
| 2,031,640 | Geraldson | Feb. 25, 1936 |
| 2,171,031 | Graham et al. | Aug. 29, 1939 |
| 2,190,359 | Hipple | Feb. 13, 1940 |
| 2,263,652 | Silver | Nov. 25, 1941 |
| 2,269,987 | Raney et al. | Jan. 13, 1942 |
| 2,336,152 | Rude | Dec. 7, 1943 |
| 2,351,078 | Silver | June 13, 1944 |
| 2,361,083 | Burnett | Oct. 24, 1944 |
| 2,363,749 | Rude | Nov. 28, 1944 |
| 2,364,367 | Janke | Dec. 5, 1944 |
| 2,376,559 | Smith | May 22, 1945 |

FOREIGN PATENTS

| Number | Country | Date |
|---|---|---|
| 546,245 | Great Britain | July 3, 1942 |